US012811120B2

(12) United States Patent
Le Blanc et al.

(10) Patent No.: US 12,811,120 B2
(45) Date of Patent: Nov. 24, 2026

(54) HIGH RESOLUTION DETECTION TO MANAGE GROUP DETECTION FOR QUANTITATIVE ANALYSIS BY MS/MS

(71) Applicant: DH TECHNOLOGIES DEVELOPMENT PTE. LTD., Singapore (SG)

(72) Inventors: Yves Le Blanc, Newmarket (CA); David M. Cox, Toronto (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 586 days.

(21) Appl. No.: 18/247,799

(22) PCT Filed: Oct. 7, 2021

(86) PCT No.: PCT/IB2021/059220

§ 371 (c)(1),
(2) Date: Apr. 4, 2023

(87) PCT Pub. No.: WO2022/074610

PCT Pub. Date: Apr. 14, 2022

(65) Prior Publication Data

US 2023/0377865 A1 Nov. 23, 2023

Related U.S. Application Data

(60) Provisional application No. 63/088,669, filed on Oct. 7, 2020.

(51) Int. Cl.

*H01J 49/00* (2006.01)
*G01N 30/02* (2006.01)

(Continued)

(52) U.S. Cl.

CPC .......... *H01J 49/0045* (2013.01); *G01N 30/14* (2013.01); *G01N 30/7233* (2013.01); *G01N 2030/027* (2013.01)

(58) Field of Classification Search

CPC . H01J 49/0045; G01N 30/14; G01N 30/7233; G01N 2023/027

See application file for complete search history.

(56) References Cited

U.S. PATENT DOCUMENTS 10,566,178 B2 * 2/2020 Lemoine ............. H01J 49/0031

FOREIGN PATENT DOCUMENTS

WO 2017093861 A1 6/2017

OTHER PUBLICATIONS

International Search Report and Written Opinion for PCT/IB2021/059220, mailed Dec. 22, 2021.

(Continued)

*Primary Examiner* — Georgia Y Epps
*Assistant Examiner* — Hanway Chang
(74) *Attorney, Agent, or Firm* — Potomac Law Group, PLLC; Reza Mollaaghababa; Brian Hairston

(57) ABSTRACT

A tandem mass spectrometer may be operative to receive sample ions and to monitor a MS scan for a sentinel ion. Upon detection of the sentinel ion in MS1, the mass spectrometer switches to a group of at least one MS/MS scan associated with the sentinel ion to fragment incoming sample ions and to mass analyze resulting product ions of the fragmentation.

20 Claims, 9 Drawing Sheets

(51) Int. Cl.
*G01N 30/14* (2006.01)
*G01N 30/72* (2006.01)

(56) References Cited

OTHER PUBLICATIONS

Wei Yan et al.: "Index-ion Triggered MS2 Ion Quantification: A Novel Proteomics Approach for Reproducible Detection and Quantification of Targeted Proteins in Complex Mixtures," Molecular & Cellular Proteomics, vol. 10, No. 3, Dec. 2020, XP055504117.

* cited by examiner

200

HIGH RESOLUTION DETECTION TO MANAGE GROUP DETECTION FOR QUANTITATIVE ANALYSIS BY MS/MS

RELATED US APPLICATIONS

This application claims the benefit of priority from U.S. Provisional Application No. 63/088,669, filed on Oct. 7, 2020, the entire contents of which is hereby incorporated by reference herein.

INTRODUCTION

The teachings herein relate to operating a high resolution tandem mass spectrometer to trigger a group of precursor ion to full product ion spectrum mass spectrometry/mass spectrometry (MS/MS) scans to identify or quantitate a known compound. More specifically, in some embodiments, systems and methods are provided to trigger the next group of MS/MS scans to be executed by a high resolution tandem mass spectrometer based on detection of a sentinel ion during an MS scan.

Sentinel Analysis and High Resolution MS/MS

Multiple reaction monitoring (MRM) or selected reaction monitoring (SRM) is a targeted acquisition method, as described below. In MRM, one or more transitions of a precursor ion to a product ion are predefined for compounds of a sample. As the sample is being introduced into the tandem mass spectrometer, the precursor ion of each transition of the one or more transitions is selected and fragmented and the product ion of each transition is mass analyzed, producing a product ion intensity for each transition.

MRM is often performed in liquid chromatography coupled mass spectrometry/mass spectrometry (LC-MS/MS) experiments that are used to identify or quantify one or more compounds of interest. When a complex sample that includes many different compounds of interest is analyzed, the number of MRM transitions used in the analysis may become large. In order to reduce the number of MRM transitions that are performed in one cycle of a tandem mass spectrometer, a method for scheduling the MRM transitions was developed. This method is referred to as scheduled MRM.

In scheduled MRM, each MRM transition to be analyzed during the experiment is also assigned a retention time or retention time range. During the experiment, MRM transitions are then added to and removed from a list of transitions to be executed during each cycle of the tandem mass spectrometer based on their retention time or retention time range. In this way, the number of transitions being executed during any one cycle is reduced.

Unfortunately, however, in some instances, compounds of interest may not separate from a sample at the retention times specified in a scheduled MRM experiment. For example, the scheduled MRM experiment may be performed by a different laboratory or under different experimental conditions. In addition, scheduled MRM is dependent on the accuracy and absolute value of the retention time used for each transition. Whenever the separation device changes or the gradient of separation changes, the retention time for each transition must be recomputed. This becomes particularly cumbersome when workflows include thousands of MRM transitions. This also makes it difficult to use scheduled MRM workflows across separation devices produced by different manufacturers that have different elution rates. Further, the separation may not be based on retention time at all.

As a result, a method for triggering MRM transitions that is not based on retention time was developed. In this method, a scout or sentinel MRM transition is used to trigger a group of additional MRM transitions to be analyzed. More specifically, the MRM transitions of an experiment for a sample are divided into two or more contiguous groups of MRM transitions so that the groups are executed sequentially. Each group includes at least one scout or sentinel MRM transition that identifies the next group of MRM transitions to be executed.

During acquisition, a first group of MRM transitions is selected for monitoring. When at least one sentinel MS/MS scan in the first group is detected by the tandem mass spectrometer, the next group of MRM transitions identified by the at least one sentinel MS/MS scan is added to the list of transitions monitored by the tandem mass spectrometer. In other words, at least one sentinel MS/MS scan in each group is used to trigger the transitions in the next contiguous group.

A group of MRM transitions can also be removed from monitoring. For example, once at least one sentinel MS/MS scan in the next contiguous group is detected, the transitions in the first group can be removed from monitoring.

As a result, by using sentinel transitions to trigger the addition and subtraction of MRM transitions from monitoring, the overall number of MRM transitions being monitored at any one time is reduced. In addition, because the groups of transitions are not dependent on a specific retention time, workflows based on these systems and methods can be used without modification whenever the separation device changes or the gradient of separation changes.

U.S. Pat. No. 10,566,178 (hereinafter the "'178 Patent"), incorporated herein by reference, describes using sentinel transitions to overcome the limitations of scheduled MRM. The '178 Patent describes systems and methods in which sentinel transitions are used in conjunction with a system that includes a separation device, such as LC, for separating compounds from a sample.

U.S. patent application Ser. No. 16/790,803 (hereinafter the "'803 Application"), incorporated herein by reference, is a continuation application of '178 Patent and describes systems and methods in which sentinel transitions are used without a separation device. The '803 Application essentially describes systems and methods in which sentinel transitions are used in conjunction with any method of introducing compounds of interest into a tandem mass spectrometer.

One exemplary method of introducing compounds of interest into a tandem mass spectrometer without a separation device is through the use of a sample introduction device. U.S. Provisional Patent Application No. 63/029,226 (hereinafter the "'226 Application"), incorporated herein by reference, describes systems and methods in which scout or sentinel transitions are used in conjunction with a sample introduction device that ejects samples at an ejection time and according to a sample order. An exemplary sample introduction device that ejects samples at an ejection time and according to a sample order is an acoustic droplet ejection (ADE) device that delivers samples rapidly to an open port interface (OPI) from individual microtiter plate wells.

MRM experiments are typically performed using "low resolution" instruments that include, but are not limited to, triple quadrupole (QqQ) or quadrupole linear ion trap (QqLIT) devices. With the advent of "high resolution" instruments, there was a desire to collect MS and MS/MS using workflows that are similar to QqQ/QqLIT systems. High resolution instruments include, but are not limited to, quadrupole time-of-flight (QqTOF), electrostatic ion traps (ELIT), TOF-TOF, or orbital ion trap devices (e.g Orbitrap. These high resolution instruments also provide new functionality.

MRM on QqQ/QqLIT systems is the standard mass spectrometric technique of choice for targeted quantification in all application areas, due to its ability to provide the highest specificity and sensitivity for the detection of specific components in complex mixtures. However, the speed and sensitivity of today's accurate mass systems have enabled a new quantification strategy with similar performance characteristics. In this strategy (termed MRM high resolution (MRM-HR) or parallel reaction monitoring (PRM)), looped MS/MS spectra are collected at high-resolution with short accumulation times, and then fragment ions (product ions) are extracted post-acquisition to generate MRM-like peaks for integration and quantification. With instrumentation like the TRIPLETOF® Systems of SCIEX, this targeted technique is sensitive and fast enough to enable quantitative performance similar to higher end triple quadrupole instruments, with full fragmentation data measured at high resolution and high mass accuracy.

In other words, in methods such as MRM-HR, a high resolution precursor ion mass spectrum is obtained, one or more precursor ions are selected and fragmented, and a high resolution full product ion spectrum is obtained for each selected precursor ion. A full product ion spectrum is collected for each selected precursor ion but a product ion mass of interest can be specified and everything other than the mass window of the product ion mass of interest can be discarded.

As a result, scout or sentinel analysis can similarly be performed with a high resolution tandem mass spectrometer capable of performing MRM-HR. In the conventional method of performing sentinel analysis described above, the detection of the product ion of an MRM transition provides the selectivity needed to avoid a false trigger of additional associated MRM transitions. However, the added functionally of high resolution tandem mass spectrometers may provide the needed selectivity in other ways. Consequently, there is a need for additional systems and methods for performing sentinel analysis using high resolution tandem mass spectrometers.

Mass Spectrometry Background

Mass spectrometers are often coupled with separation devices, such as chromatography devices, or sample introduction systems, such as an ADE device and OPI, in order to identify and characterize compounds of interest from a sample or to analyze multiple samples. In such a coupled system, the eluting or injected solvent is ionized and a series of mass spectra are obtained from the eluting solvent at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in a sample, for example. More particularly, the retention times of peaks and/or the area of peaks are used to identify or characterize (quantify) a known peptide or compound in the sample. In the case of multiple samples provided over time by a sample introduction device, the retention times of peaks are used to align the peaks with the correct sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In a targeted acquisition method, a list of transitions is typically interrogated during each cycle time. In order to decrease the number of transitions that are interrogated at any one time, some targeted acquisition methods have been modified to include a retention time or a retention time range for each transition. Only at that retention time or within that retention time range will that particular transition be interrogated. One targeted acquisition method that allows retention times to be specified with transitions is referred to as scheduled MRM.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, $MS/MS^{ALL}$. In an $MS/MS^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the $MS/MS^{ALL}$ method, all the precursor ions in each precursor ion mass selection window are fragmented, and all of the product ions of all of the precursor ions in each mass selection window are mass analyzed.

SUMMARY

A system, method, and computer program product are provided for triggering a group of precursor ion to full product ion spectrum MS/MS scans from a series of contiguous groups when an accurate mass of at least one sentinel MS/MS scan of the group is detected during an MS scan for precursor ions (i.e. a precursor ion MS scan). The system includes an ion source, a tandem mass spectrometer, and a processor.

In some embodiments, the sentinel ion used during the method may be selected for its mass distinctiveness when operating the tandem mass spectrometer to perform an MS scan monitoring for the sentinel ion. In some embodiments, one or more isotopes of the sentinel ion my be detected and evaluated to confirm the presence of the sentinel ion.

The ion source ionizes one or more compounds of a sample, producing an ion beam of one or more precursor ions. The tandem mass spectrometer receives the ion beam from the ion source. For each cycle of a plurality of cycles, the tandem mass spectrometer executes on the ion beam an MS scan followed by a series of MS/MS scans read from a list. For each MS/MS scan of the series, if an accurate mass of a precursor ion of the each MS/MS scan is found within a mass threshold from the MS scan, the tandem mass spectrometer selects and fragments the precursor ion, and mass analyzes all resulting product ions of the fragmentation of the precursor ion.

The processor receives a plurality of MS/MS scans that each includes a precursor ion accurate mass. The plurality of MS/MS scans are received from a user, for example. The processor divides the plurality of MS/MS scans into two or more contiguous groups so that different groups can be executed separately during the plurality of cycles. The processor selects at least one sentinel MS/MS scan in each preceding group of the two or more contiguous groups that identifies a next group of the two or more contiguous groups that is to be executed. The at least one sentinel MS/MS scan identifies or triggers the next adjacent group of the two or more contiguous groups, for example. The processor places a first group of the two or more contiguous groups on the list of the tandem mass spectrometer, so that the tandem mass spectrometer executes the MS/MS scans of the first group. When a precursor ion accurate mass of a sentinel MS/MS scan of the first group is detected by the tandem mass spectrometer, the processor places a next group of the two or more contiguous groups identified by the sentinel MS/MS scan on the list.

In various embodiments, a high-resolution tandem mass spectrometer is described comprising: a mass filter; a fragmentation cell; a high-resolution mass analyzer; and, a controller for directing operation of the mass filter, fragmentation cell, and high-resolution mass analyzer; wherein, the controller is operative to direct the mass spectrometer to monitor an MS scan for a sentinel ion; and, when the mass spectrometer detects the sentinel ion, the controller is operative to direct the mass spectrometer to switch to a group of at least one MS/MS scans associated with the sentinel ion to fragment incoming sample ions and to mass analyze resulting product ions of the fragmentation.

In various embodiments, a method for mass spectrometry is provided for operation by a tandem mass spectrometer as described, the method comprising: receiving an ion beam of sample ions; monitoring an MS scan of precursor ions performed on the ion beam for a sentinel ion; detecting the sentinel ion in the MS scan; triggering a group of at least one MS/MS scan associated with the sentinel ion; and, for each of the at least one MS/MS scan modes: fragmenting the ion beam; and mass analyzing resulting product ions.

In various embodiments, the sentinel ion comprises a mass distinctive sentinel ion selected for its mass distinctiveness when detected using an MS scan mode of the mass spectrometer.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
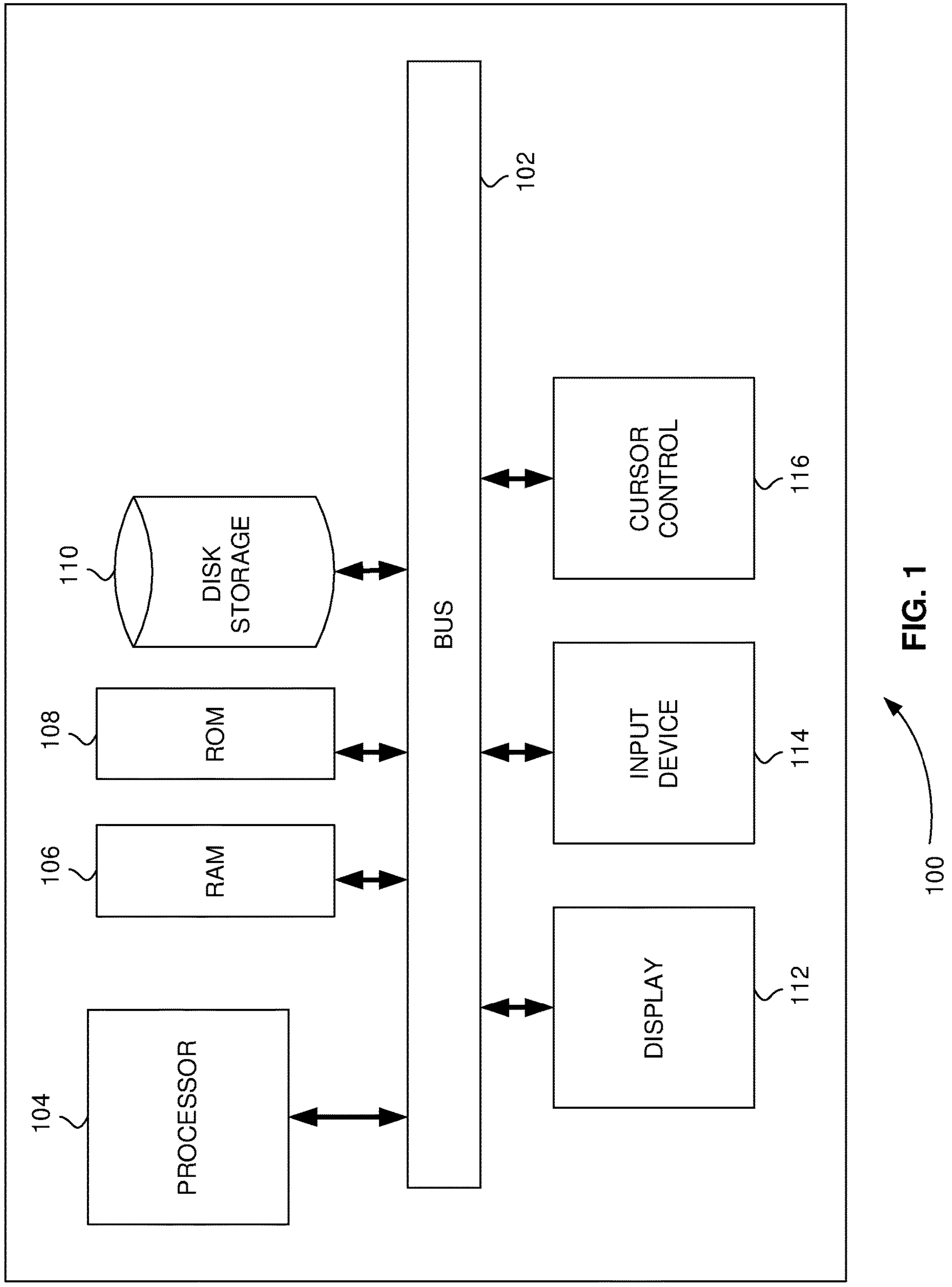
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings Additionally, the described implementation includes software but the present teachings may be implemented as a combination of hardware and software or in hardware alone. The present teachings may be implemented with both object-oriented and non-object-oriented programming systems.

Precursor Ion Accurate Mass Triggered Sentinel Analysis

As described above, one way to increase the duty-cycle of MS/MS data collection on low resolution tandem mass spectrometry systems (QqQ/QqLIT) is to rely on time scheduling of MRM during the chromatographic separation. With scheduled MRM, users have been able to monitor significantly larger panels of analytes. However, with the ability to monitor larger panels of analytes by MRM, using small detection windows around specific retention times, comes the added complexity of managing long lists of retention times to ensure proper detection.

With the development of scout or sentinel analysis, as described in the ’178 Patent, the ’803 Application, and the ’226 Application, the user is no longer required to manage retention time values in the list. Instead, MRM detection (selective detection) of a sentinel MRM transition determines if a group of additional MRM transitions should start being monitored. So, the triggering of additional MRM transitions is no longer dependent on a retention time window. This concept was developed on low resolution QqQ/QqLIT systems and relies on MRM transition detection to significantly reduce false detections and consequently trigger all other MRM within a group.

With the advent of high-resolution tandem mass spectrometry instruments, there was a desire to collect MS and MS/MS information using workflows that are similar to QqQ/QqLIT systems. In addition, new functionality was introduced to high resolution systems, such as QqTOF systems. One such functionality was MRM-HR on TRIPLETOF® Systems of SCIEX, for example. MRM-HR, for example, provides a simple interface where a user provides a list of desired product ion masses to be collected from a precursor ion in either full-scan or with a small window around a given product ion (hence an MRM-like workflow).

On these high resolution systems, a user can optionally specify a retention time detection window to orchestrate the best data collection. In the conventional method of performing sentinel analysis described above, the detection of the product ion of an MRM transition provides the selectivity needed to avoid a false trigger of additional associated MRM transitions. However, the added functionally of high resolution tandem mass spectrometers may provide the needed selectivity in other ways. Consequently, there is a need for additional systems and methods for performing sentinel analysis using high resolution tandem mass spectrometers.

In various embodiments, an accurate mass of a precursor ion detected during a high resolution MS scan is used to trigger a group of high resolution precursor ion to full product ion spectrum MS/MS scans in sentinel analysis. Essentially, a high resolution MS scan can produce a selectivity similar to an MRM transition in conventional sentinel analysis.

In the present application, the term MS/MS scan is used to refer to a mode of operation of the tandem mass spectrometer that applies a combination of mass filtering, fragmentation and high-resolution mass analysis to select one or more target ions from the ion beam, fragment the target ions, and mass analyze the resulting product ions. A particular MS/MS scan mode defines the operational parameters of the mass spectrometer to select, fragment and analyze specific target compound(s).

Conveniently, a sentinel ion may be selected for its mass distinctiveness. For example, a sentinel ion may be selected for a distinctive mass in a relatively noise free location based on expected sample ions. The mass distinctiveness may be provided, for instance by a mass defect. Contrary to prior art teachings, which employed sentinel ions having distinctive/distinguishable fragmentation patterns, the fragmentation pattern of the present sentinel ion is not important since the systems and methods rely on the high resolution mass analysis during an MS scan to identify the sentinel ion.

In addition, in various embodiments, an isotopic pattern of a precursor ion detected during a high resolution MS scan is further used to trigger a group of high resolution precursor ion to full product ion spectrum MS/MS scans in sentinel analysis. The isotopic pattern is used in addition to the accurate mass of the precursor ion to provide the selectivity for sentinel analysis.

Originally, MRM-HR was meant to be used in similar sentinel analysis workflows as those used by QqQ/QqLIT tandem mass spectrometers (using a simple table of MRM transitions of interest). However, users of high resolution systems have generally adopted a high resolution workflow that combines high-resolution MS data collection in conjunction with MRM-HR (a looped experiment that collects both at the same time). The MS scan is for screening and quantitation of unknowns, for example. The MRM-HR method is used to target compounds to have an added level of selectivity (MS/MS scans).

Since a high resolution MS scan can offer selectivity that can rival MRM detection, in various embodiments, a group of MS/MS scans is triggered in sentinel analysis by using an accurate mass of a precursor ion sentinel or both the accurate mass and expected isotope pattern or a precursor ion accurate isotope ratio of a precursor ion sentinel. Since the accurate mass and the expected isotope pattern are obtained at the MS scan level, in various embodiments, the need to perform MSMS analysis on compounds during certain cycles is alleviated. Under high resolution analysis mode, a high degree of selectivity is achieved and the false detection of sentinel precursor ions and associated triggering of a group of MS/MS scans targeted for analysis is minimized.

Figure 2:
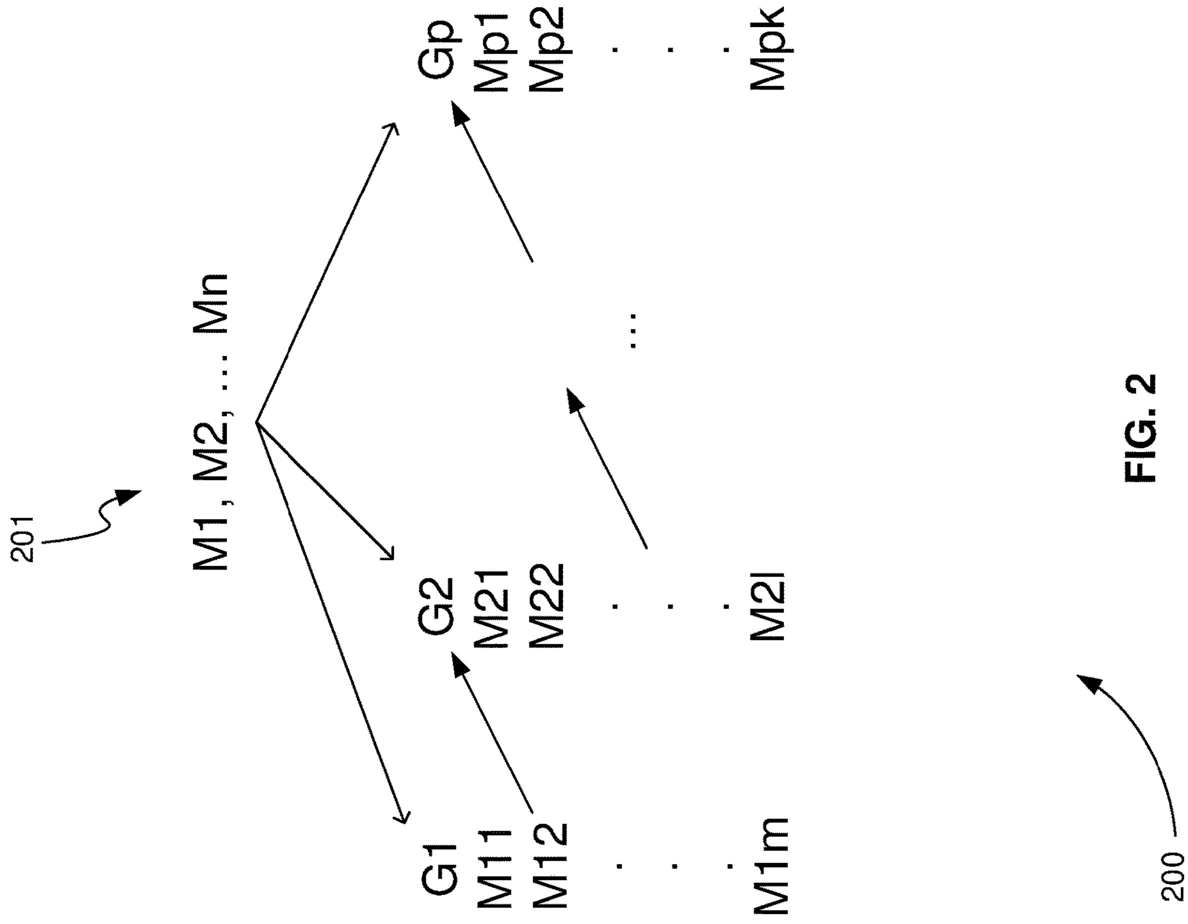
FIG. 2 is an exemplary diagram showing how accurate mass information about a plurality of MS/MS scans is used to divide the plurality of MS/MS scans into two or more contiguous groups of MS/MS scans that each contain at least one sentinel MS/MS scan that identifies a next group, in accordance with various embodiments.

FIG. 2 is an exemplary diagram 200 showing how accurate mass information about a plurality of MS/MS scans is used to divide the plurality of MS/MS scans into two or more contiguous groups of MS/MS scans that each contains at least one sentinel MS/MS scan that identifies a next group, in accordance with various embodiments. Each group of MS/MS scans comprising a series of MS/MS scans to be performed by a tandem mass spectrometer. Each MS/MS scan may include an MS scan as part of the analysis. In this context, the groups are contiguous as they are logically arranged in a series of expected compound delivery order in time. In the case of sample delivery from a chromatography column, the series may be constructed as an expected elution order of compounds from the chromatography column. For other types of sample introduction apparatus, such as ADE-OPI, the series may be constructed based on expected delivery time, or grouped based on expected presence within a sample well.

A user, for example, specifies a plurality of MS/MS scans 201. Plurality of MS/MS scans 201 is specified by providing, at least, a precursor ion accurate mass (M1, M2, . . . , Mn) for each MS/MS scan as shown in FIG. 2. In various embodiments, other information that can be specified for each MS/MS scan of plurality of MS/MS scans 201 can include, but is not limited to, one or more product ions to be selected from the product ion spectrum, a product ion mass window, or a retention time or retention time window for the precursor ion.

Note that the terms "mass" and "mass-to-charge ratio (m/z)" can be used interchangeably. One of ordinary skill in the art understands that mass can be converted to m/z by dividing by the charge, and m/z can be converted to mass by multiplying by the charge. As a result, the use of the term "mass" should also include "m/z," and the use of the term "m/z" should also include "mass."

Plurality of MS/MS scans 201 is divided into two or more contiguous groups of MS/MS scans (G1, G2, . . . , Gp), i.e. separate series that each contain at least one MS/MS scan to be executed by the tandem Mass spectrometer. For example, if a separation device is being used, plurality of MS/MS scans 201 can be divided into a plurality of series of at least one MS/MS scan based on an expected retention time or retention time window for the precursor ion of each MS/MS scan. The mass spectrometer may be operative to store a group of MS/MS scan as a series or list and to execute the at least one MS/MS scan in series order from the list. Or, for example, if a sample introduction system is being used, plurality of MS/MS scans 201 can be divided based on the time or order of sample introduction.

Each preceding group of the MS/MS scan of two or more contiguous groups includes at least one sentinel MS/MS scan corresponding for a sentinel ion associated with that group. The sentinel MS/MS scan identifies the next group of the two or more contiguous groups. For example, in FIG. 2, group G1 includes a sentinel MS/MS scan represented by precursor ion accurate mass M12 that identifies next group G2 of MS/MS scans. Thus, the sentinel MS/MS scan comprises an MS scan of precursor ions of a sentinel ion.

Consequently, when precursor ion accurate mass M12 of the sentinel MS/MS scan of group G1 is detected during an MS precursor ion scan, the MS/MS scans of next group G2 are added to the list of MS/MS scans to be performed during each cycle of the analysis. Note that an MS/MS scan on the list may not be executed if the precursor ion accurate mass of the MS/MS scan was not detected in the preceding MS scan. Note also that MS/MS scans of a preceding group may be removed from the list when a next group is added. The preceding may not be the immediately preceding group, since some overlap between groups of MS/MS scans may be needed.

In FIG. 2, the precursor ion accurate mass of an MS/MS scan provides the selectivity needed to select a next group of MS/MS scans for analysis. In various embodiments, this selectivity is further enhanced by also requiring the identification of an isotopic pattern of the precursor ion of the sentinel MS/MS scan. For example, when a precursor ion accurate mass of a sentinel MS/MS scan is detected in an MS scan, the MS scan is further searched for one or more expected isotopes of the detected precursor ion. An isotope is detected by detecting a precursor ion peak in the MS precursor ion spectrum at an expected isotope ratio. An expected isotope ratio is, for example, an isotopic mass divided by the expected precursor ion mass. Again, mass or m/z may be used. In other embodiments, a mass accuracy may be also be utilized.

In some embodiments, the mass spectrometer and/or its controller is further operative to confirm detection of the sentinel ion by MS/MS, and wherein the mass spectrometer detects the sentinel ion by evaluating the detected sentinel ion and the at least one fragment ion of the sentinel ion before the mass spectrometer is instructed to switch to the next group of MS/MS scans.

Figure 3:
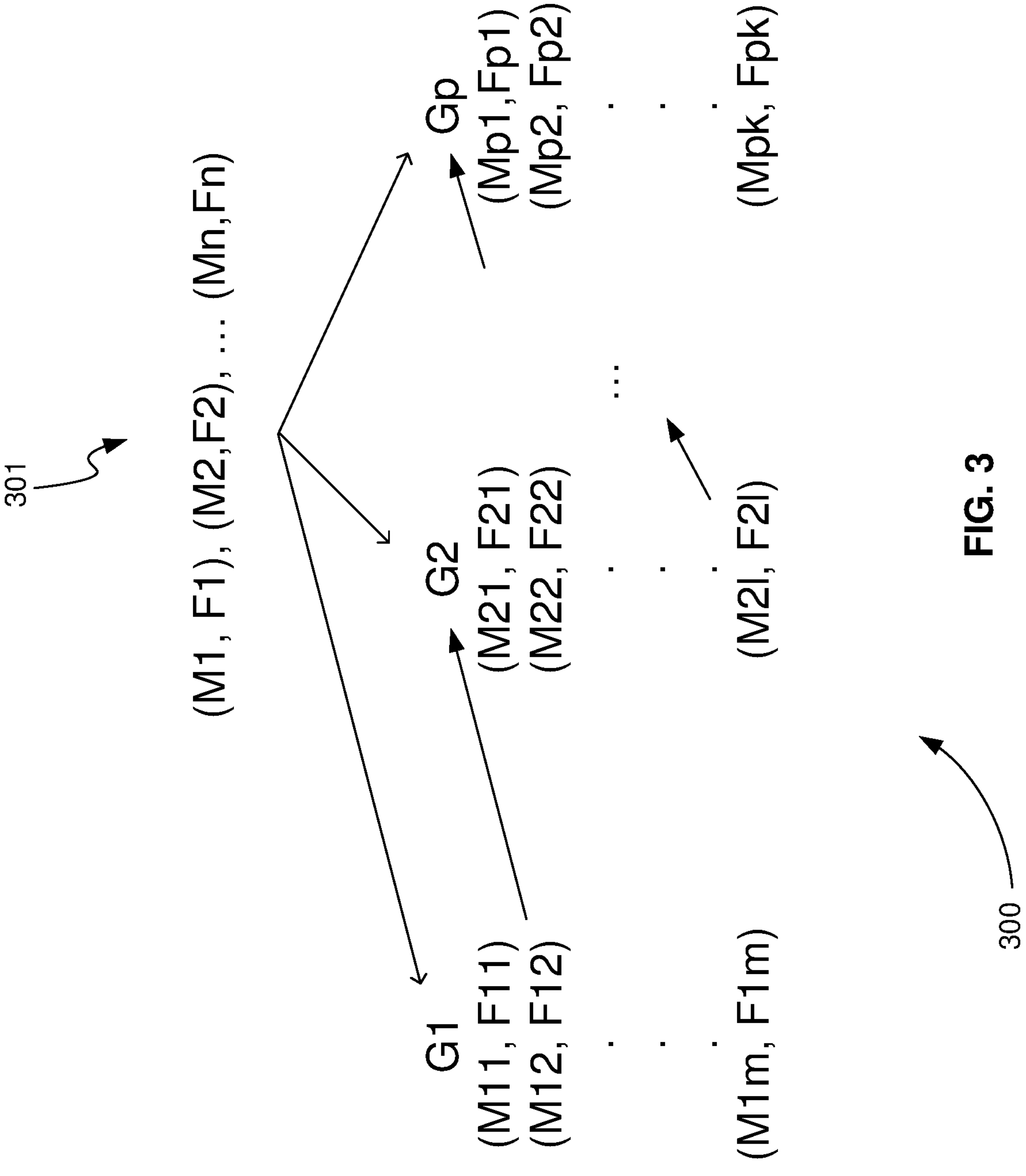
FIG. 3 is an exemplary diagram showing how both accurate mass and chemical formula information about a plurality of MS/MS scans is used to divide the plurality of MS/MS scans into two or more contiguous groups of MS/MS scans that each contain at least one sentinel MS/MS scan that identifies a next group, in accordance with various embodiments.

FIG. 3 is an exemplary diagram 300 showing how both accurate mass and chemical formula information about a plurality of MS/MS scans is used to divide the plurality of MS/MS scans into two or more contiguous groups of MS/MS scans that each contains at least one sentinel MS/MS scan that identifies a next group, in accordance with various embodiments. A user, for example, specifies a plurality of MS/MS scans 301. Plurality of MS/MS scans 201 is specified by providing both a precursor ion accurate mass (M1, M2, . . . , Mn) and a precursor ion chemical formula (F1, F2, . . . , Fn) for each MS/MS scan as shown in FIG. 3. In various embodiments, again, other information that can be specified for each MS/MS scan of plurality of MS/MS scans 301 can include, but is not limited to, one or more product ions to be selected from the product ion spectrum, a product ion mass window, or a retention time or retention time window for the precursor ion.

Plurality of MS/MS scans 301 is divided into two or more contiguous groups of MS/MS scans (G1, G2, . . . , Gp). For example, if a separation device is being used, plurality of MS/MS scans 301 can be divided based on an expected retention time or retention time window for the precursor ion of each MS/MS scan. Or, for example, if a sample introduction system is being used, plurality of MS/MS scans 301 can be divided based on the time or order of sample introduction.

Each preceding group of the MS/MS scan of two or more contiguous groups includes at least one sentinel MS/MS scan. The sentinel MS/MS scan identifies the next group of the two or more contiguous groups. For example, in FIG. 2, group G1 includes a sentinel MS/MS scan represented by precursor ion accurate mass M12 and precursor ion chemical formula F12 that identifies next group G2 of MS/MS scans.

Consequently, when both precursor ion accurate mass M12 and an isotope calculated from precursor ion chemical formula F12 of the sentinel MS/MS scan of group G1 is detected during an MS precursor ion scan, the MS/MS scans of next group G2 are added to the list of MS/MS scans to be performed during each cycle of the analysis. In FIG. 3, both the precursor ion accurate mass and the isotope calculated from the precursor ion chemical formula of an MS/MS scan provide the selectivity needed to select a next group of MS/MS scans for analysis. In various embodiments, the mass accuracy can also provide information confirming the presence of a sentinel ion.

System for Triggering MS/MS Scans Based on Precursor Ion Accurate Mass

Figure 4:
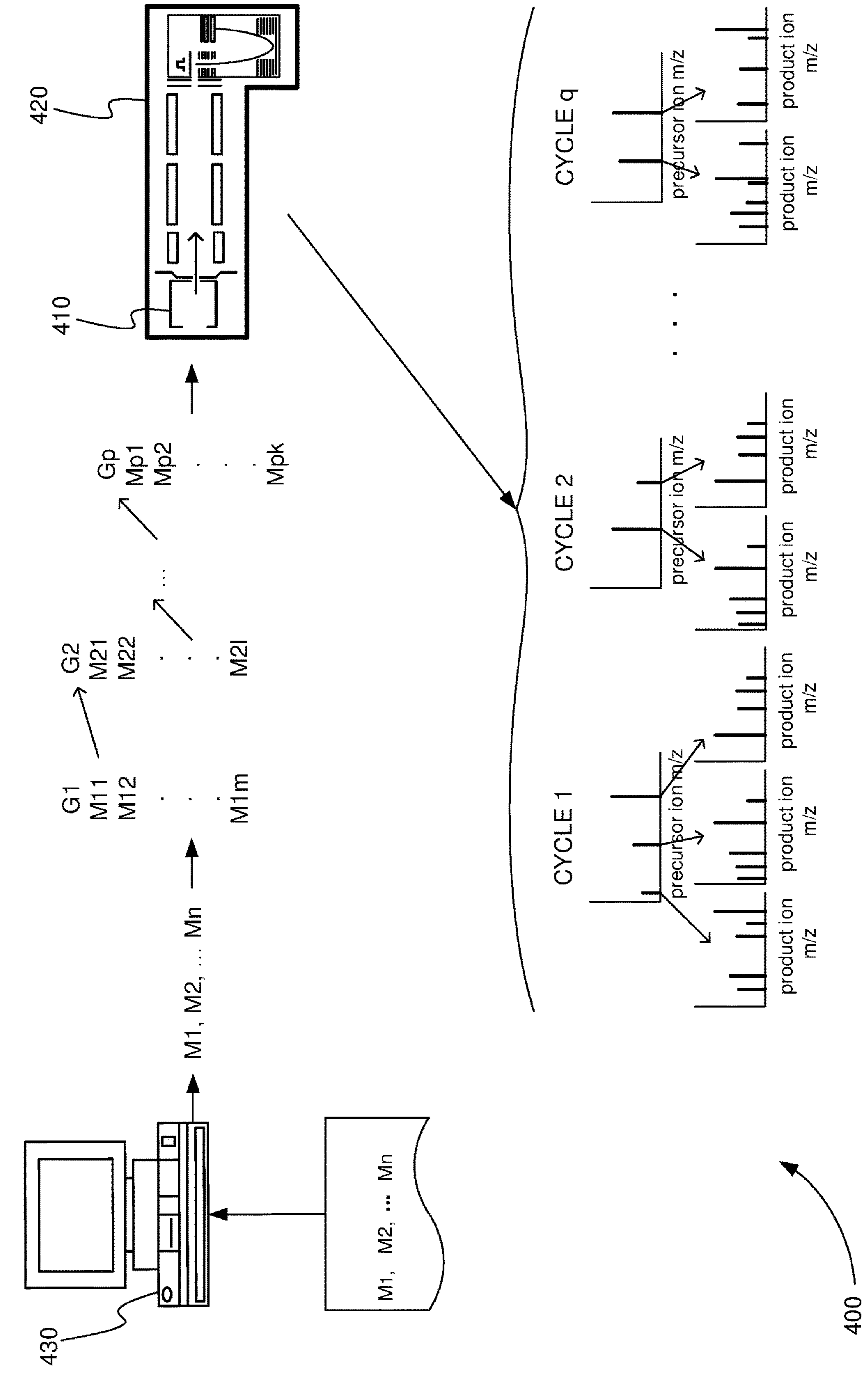
FIG. 4 is a schematic diagram of system for triggering a group of precursor ion to full product ion spectrum MS/MS scans from a series of contiguous groups when an accurate mass of at least one sentinel MS/MS scan of the group is detected during a precursor ion MS scan, in accordance with various embodiments.

FIG. 4 is a schematic diagram of system 400 for triggering a group of precursor ion to full product ion spectrum MS/MS scans from a series of contiguous groups when an accurate mass of at least one sentinel MS/MS scan of the group is detected during a precursor ion MS scan, in accordance with various embodiments. System 400 includes ion source 410, tandem mass spectrometer 420, and processor 430.

Ion source 410 ionizes one or more compounds of a sample, producing an ion beam of one or more precursor ions. The sample is a sample mixture, for example. Ion source 410 includes any type of ion source device including, but not limited to, a device that performs electrospray ionization (ESI). Ion source 410 can be part of tandem mass spectrometer 420, as shown in FIG. 4, or can be a separate device.

In various embodiments, the one or more compounds are provided to ion source 410 by a separation device (not shown). The separation device can separate compounds over time using one of a variety of techniques. These techniques include, but are not limited to, ion mobility, gas chromatography (GC), liquid chromatography (LC), or capillary electrophoresis (CE).

In various embodiments, the one or more compounds are provided to ion source 410 by a sample introduction system (not shown). The sample introduction system can introduce the one or more compounds over time or in a sample order, for example. The sample introduction system can include, but is not limited to a flow injection analysis (FIA) device or an acoustic droplet ejection (ADE) device that delivers samples rapidly to an open port interface (OPI) from individual microtiter plate wells.

Tandem mass spectrometer 420 can include, for example, one or more physical mass filters and one or more physical mass analyzers. A mass analyzer of tandem mass spectrometer 420 can include, but is not limited to, a time-of-flight (TOF), an orbitrap, or a Fourier transform mass analyzer.

Tandem mass spectrometer 420 receives the ion beam from ion source 410. For each cycle of a plurality of cycles, tandem mass spectrometer 420 executes on the ion beam an MS scan followed by a series of MS/MS scans read from a list. The list is a duty cycle list, for example. For each MS/MS scan of the series, if an accurate mass of a precursor ion of each MS/MS scan is found within a mass threshold from the MS scan, tandem mass spectrometer 420 selects and fragments the precursor ion, and mass analyzes all resulting product ions of the fragmentation of the precursor ion. An exemplary mass threshold for an accurate mass of a precursor ion is 10 millidaltons (mDa).

The MS scan performed here is like the precursor ion or MS survey scan described above with regard to IDA. A precursor ion mass range is selected and the precursor ions within that mass range are mass analyzed using a high resolution mass analyzer. No collision energy is used or just enough collision energy is used to remove chemical background noise but not enough collision energy is used to fragment the precursor ions with the precursor ion mass range.

As just described, each MS/MS scan performed is a high resolution precursor ion to full product ion spectrum scan, for example. In each MS/MS scan, a precursor ion is selected and fragmented and all resulting product ions are mass analyzed using a high resolution mass analyzer, for example.

Processor 430 can be, but is not limited to, a computer, microprocessor, or any device capable of sending and receiving control signals and data from tandem mass spectrometer 420 and processing data. Processor 430 can be, for example, computer system 100 of FIG. 1. In various embodiments, processor 430 is in communication with tandem mass spectrometer 420.

Processor 430 receives a plurality of MS/MS scans that each includes a precursor ion accurate mass. The plurality of MS/MS scans is received from a user, for example. Processor 430 divides the plurality of MS/MS scans into two or more contiguous groups so that different groups can be executed separately during the plurality of cycles. For example, processor 430 can order the plurality of MS/MS scans according to expected retention time. Expected retention times are received for each MS/MS scan from a user, for example. Processor 430 can then divide the ordered MS/MS scans into two or more contiguous groups so that different groups can be executed separately during the plurality of cycles.

Processor 430 selects at least one sentinel MS/MS scan in each preceding group of the two or more contiguous groups that identifies a next group of the two or more contiguous groups that is to be executed. The at least one sentinel MS/MS scan identifies or triggers the next adjacent group of the two or more contiguous groups, for example.

Processor 430 places a first group of the two or more contiguous groups on the list of tandem mass spectrometer 420, so that tandem mass spectrometer 420 executes the MS/MS scans of the first group. When a precursor ion accurate mass of a sentinel MS/MS scan of the first group is detected by tandem mass spectrometer 420, processor 430 places a next group of the two or more contiguous groups identified by the sentinel MS/MS scan on the list.

In various embodiments, the selectivity of the sentinel MS/MS scan is further improved by including isotopic information about the precursor ion. For example, a sentinel MS/MS scan of the plurality of MS/MS scans further includes information about an isotope of a precursor ion the sentinel MS/MS scan. Then, when both a precursor ion accurate mass and a mass of the isotope of the precursor ion of the sentinel MS/MS are detected by the tandem mass spectrometer within the mass threshold during an MS scan, processor 430 places a next group of the two or more contiguous groups identified by the sentinel MS/MS scan on the list.

In various embodiments, the information about an isotope of a precursor ion the sentinel MS/MS scan is a precursor ion chemical formula. In various embodiments, a mass of the isotope of the precursor ion of the sentinel MS/MS is calculated from the chemical formula.

In various embodiments, each group of the two or more contiguous groups includes MS/MS scans that overlap with MS/MS scans of at least one other group of the two or more groups in order to ensure correct peak definition. The overlap is with an adjacent group, for example.

In various embodiments, processor 430 further removes the first group from the list, when a sentinel MS/MS scan of the next group is detected.

In various embodiments, processor 430 further selects a stop sentinel MS/MS scan for each next group of the two or more contiguous groups that identifies a previous group of the two or more contiguous groups. When a stop sentinel MS/MS scan of a group is detected, processor 430 further removes a previous group identified by the stop sentinel from the list.

In various embodiments, the sentinel MS/MS scans for each group of the two or more contiguous groups are monitored as part of each group, or for the entire acquisition.

For example, each group of the two or more contiguous groups further includes each sentinel MS/MS scan of the other groups of the two or more contiguous groups. This allows sentinel MS/MS scans to be independent of retention windows also. As a result, tandem mass spectrometer 420 detects a precursor ion of each MS/MS scan without using a retention time window for each MS/MS scan.

Alternatively, sentinel MS/MS scans can be executed with wide retention time windows. The groups of MS/MS scans triggered by sentinel MS/MS scans, however, are not executed according to retention time windows.

Processor 430 can select any of the MS/MS scans of a group as the at least one sentinel. For example, processor 430 can select the at least one sentinel MS/MS scan in each group by selecting an MS/MS scan of each group with the latest expected retention time. In other words, processor 430 can select the MS/MS scan at the end of each group as the sentinel MS/MS scan.

In various embodiments, processor 430 divides the plurality of MS/MS scans into two or more contiguous groups based on the order in which the one or more compounds are introduced to tandem mass spectrometer 420 by a sample introduction system.

Method for Triggering MS/MS Scans Based on Precursor Ion Accurate Mass

Figure 5:
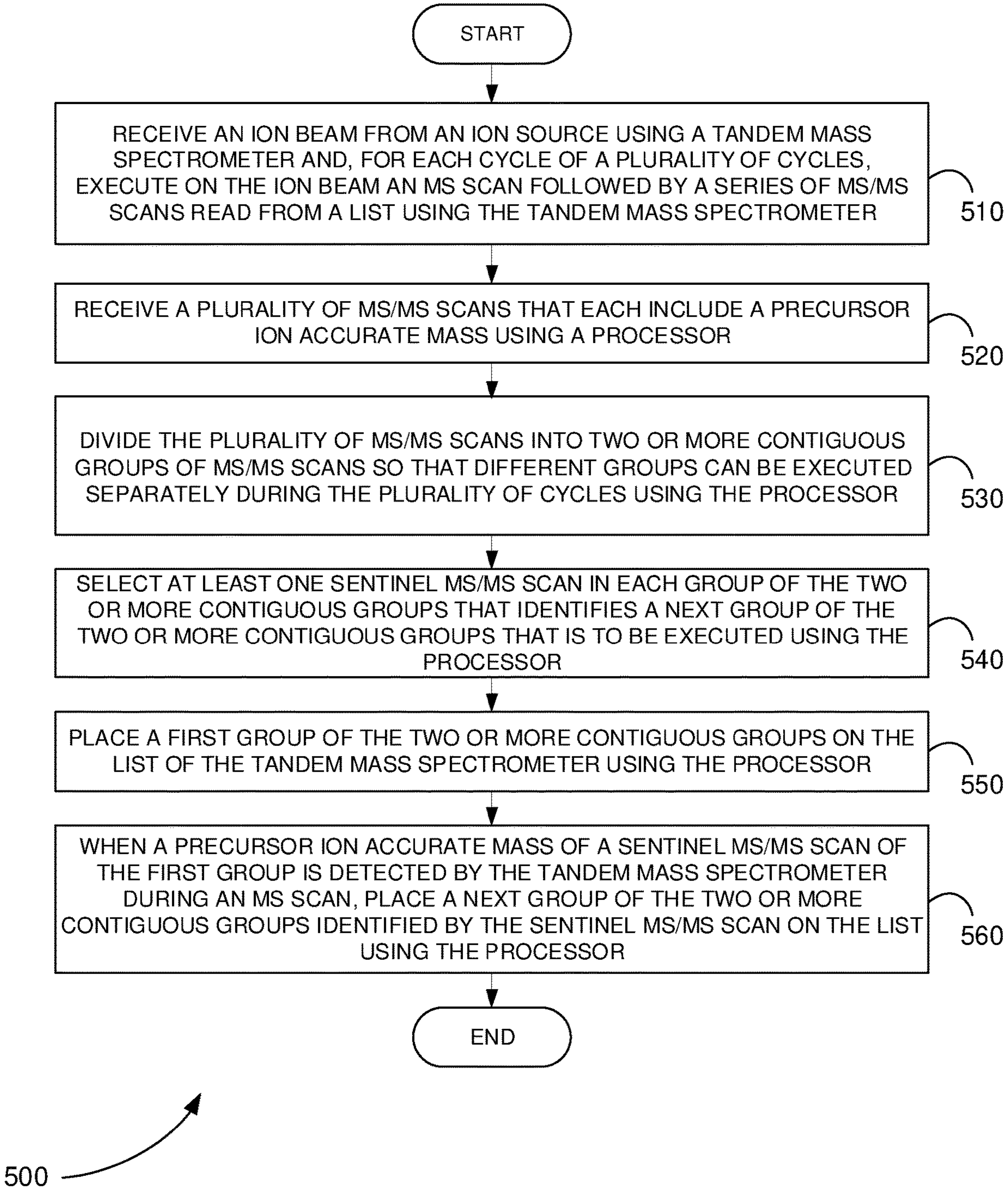
FIG. 5 is a flowchart showing a method for triggering a group of precursor ion to full product ion spectrum MS/MS scans from a series of contiguous groups when an accurate mass of at least one sentinel MS/MS scan of the group is detected during a precursor ion MS scan, in accordance with various embodiments.

FIG. 5 is a flowchart showing a method 500 for triggering a group of precursor ion to full product ion spectrum MS/MS scans from a series of contiguous groups when an accurate mass of at least one sentinel MS/MS scan of the group is detected during a precursor ion MS scan, in accordance with various embodiments.

In step 510 of method 500, an ion beam is received from an ion source using a tandem mass spectrometer and, for each cycle of a plurality of cycles, an MS scan followed by a series of MS/MS scans read from a list are executed on the ion beam using the tandem mass spectrometer. For each MS/MS scan of the series, if an accurate mass of a precursor ion of the each MS/MS scan is found within a mass threshold from the MS scan, the tandem mass spectrometer selects and fragments the precursor ion, and mass analyzes all resulting product ions of the fragmentation of the precursor ion.

In step 520, a plurality of MS/MS scans that each includes a precursor ion accurate mass is received using a processor.

In step 530, the plurality of MS/MS scans is divided into two or more contiguous groups so that different groups can be executed separately during the plurality of cycles using the processor.

In step 540, at least one sentinel MS/MS scan is selected in each preceding group of the two or more contiguous groups that identifies a next group of the two or more contiguous groups that is to be executed using the processor.

In step 550, a first group of the two or more contiguous groups is placed on the list of the tandem mass spectrometer using the processor.

In step 560, when a precursor ion accurate mass of a sentinel MS/MS scan of the first group is detected by the tandem mass spectrometer within the mass threshold during an MS scan, a next group of the two or more contiguous groups identified by the sentinel MS/MS scan is placed on the list using the processor.

When the precursor ion accurate mass of the sentinel MS/MS scan of the first group is detected by the tandem mass spectrometer within the mass threshold during the MS scan, this includes detection of the sentinel ion.

Computer Program Product for Triggering MS/MS Scans

In various embodiments, computer program products include a tangible computer-readable storage medium whose contents include a program with instructions being executed on a processor so as to perform a method for triggering a group of precursor ion to full product ion spectrum MS/MS scans from a series of contiguous groups when an accurate mass of at least one sentinel MS/MS scan of the group is detected during a precursor ion MS scan. This method is performed by a system that includes one or more distinct software modules.

Figure 6:
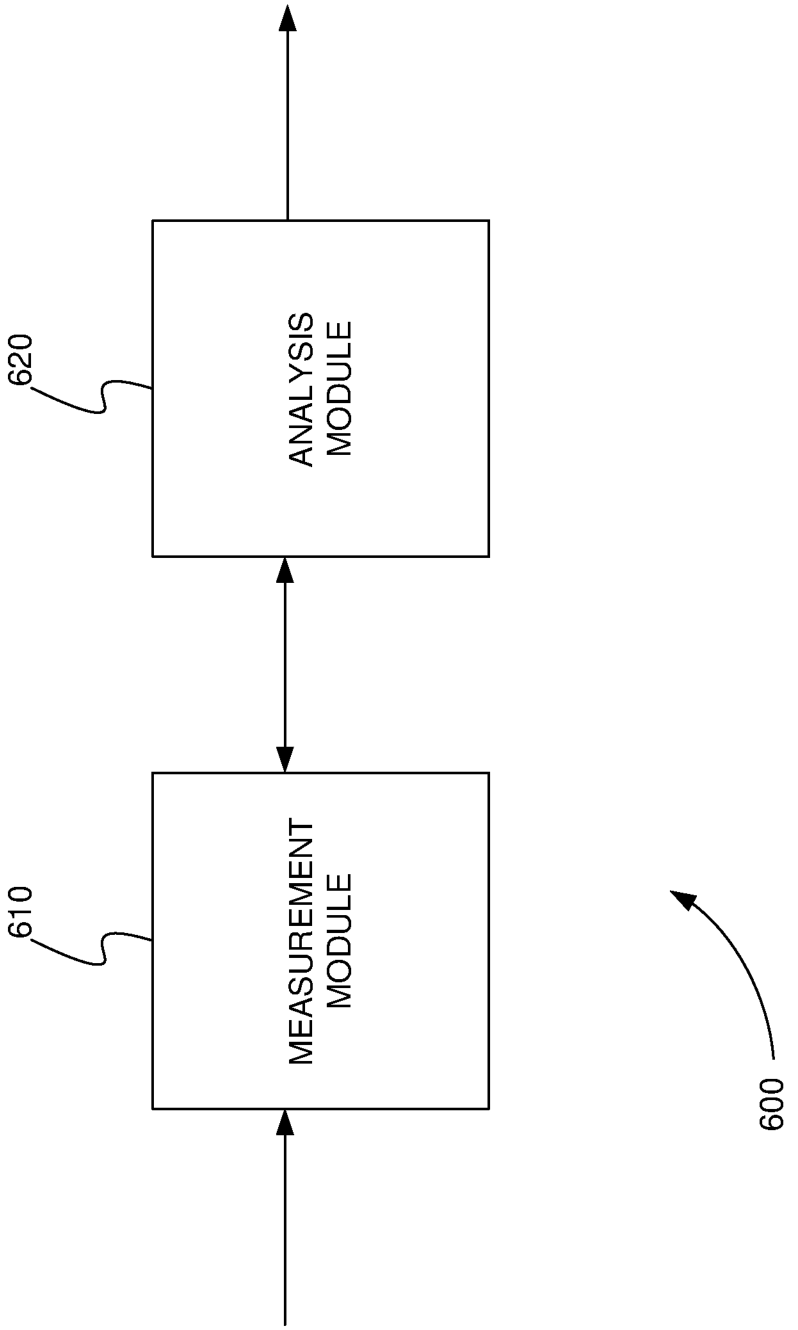
FIG. 6 is a schematic diagram of a system that includes one or more distinct software modules that performs a method for triggering a group of precursor ion to full product ion spectrum MS/MS scans from a series of contiguous groups when an accurate mass of at least one sentinel MS/MS scan of the group is detected during a precursor ion MS scan, in accordance with various embodiments.

FIG. 6 is a schematic diagram of a system 600 that includes one or more distinct software modules that performs a method for triggering a group of precursor ion to full product ion spectrum MS/MS scans from a series of contiguous groups when an accurate mass of at least one sentinel MS/MS scan of the group is detected during a precursor ion MS scan, in accordance with various embodiments. System 600 includes measurement module 610 and analysis module 620.

For each cycle of a plurality of cycles, measurement module 610 instructs a tandem mass spectrometer to execute on an ion beam an MS scan followed by a series of MS/MS scans read from a list. For each MS/MS scan of the series, if an accurate mass of a precursor ion of each MS/MS scan is found within a mass threshold from the MS scan, the tandem mass spectrometer selects and fragments the precursor ion, and mass analyzes all resulting product ions of the fragmentation of the precursor ion. The ion beam is produced by an ion source that ionizes one or more compounds separated from a sample using a separation device.

Analysis module 620 receives a plurality of MS/MS scans that each includes a precursor ion accurate mass. Analysis module 620 divides the plurality of MS/MS scans into two or more contiguous groups so that different groups can be executed separately during the plurality of cycles. Analysis module 620 selects at least one sentinel MS/MS scan in each preceding group of the two or more contiguous groups that identifies a next group of the two or more contiguous groups that is to be executed.

Measurement module 610 places a first group of the two or more contiguous groups on the list of the tandem mass spectrometer. When a precursor ion accurate mass of a sentinel MS/MS scan of the first group is detected by the tandem mass spectrometer within the mass threshold during an MS scan, measurement module 610 places a next group of the two or more contiguous groups identified by the sentinel MS/MS scan on the list.

Figure 7A:
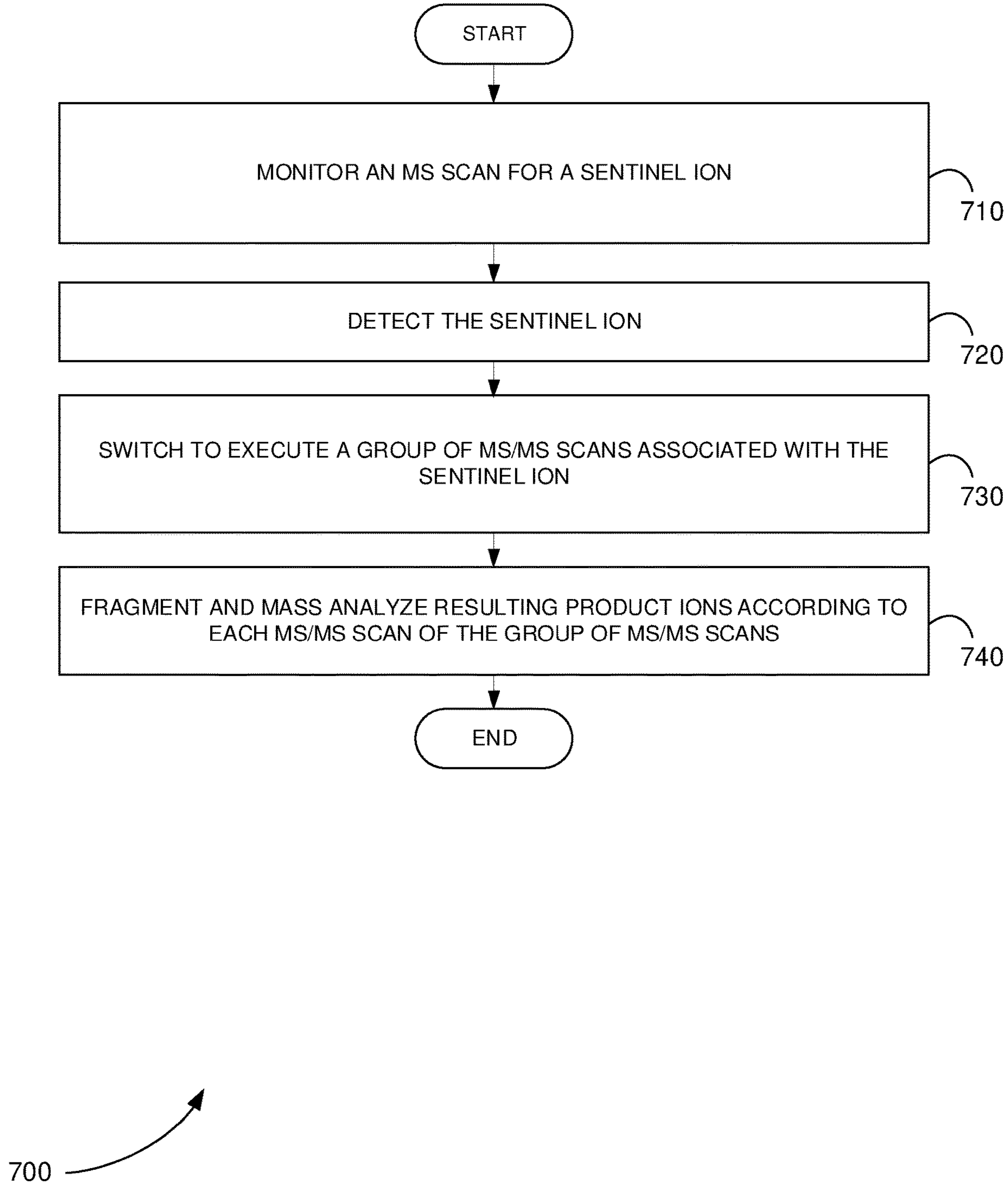
FIGS. 7A and 7B are flowcharts showing a method for switching to execute a group of MS/MS scans associated with a sentinel ion, in accordance with various embodiments.
Figure 7B:
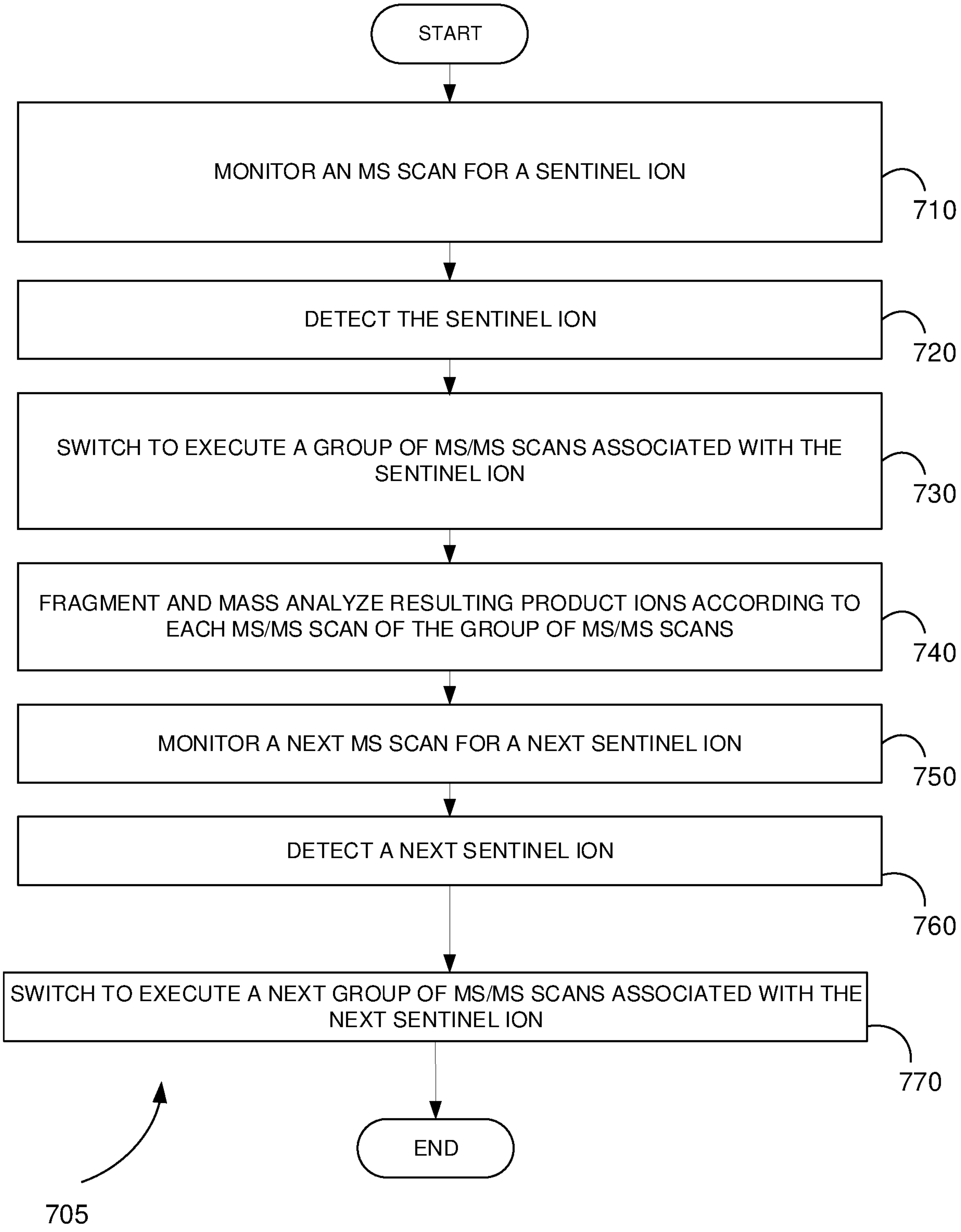

FIGS. 7A and 7B are flowcharts illustrate methods for switching a tandem mass spectrometer to execute a group of MS/MS scans associated with a sentinel ion, in accordance with various embodiments. The methods may be performed by a controller coordinating operations of the tandem mass spectrometer being performed to filter, fragment, and/or analyze an ion beam of sample ions received by the tandem mass spectrometer.

In general operation, the tandem mass spectrometer selects a subset of ions to analyze by applying at least one mass filter to the ion beam. Filtered ions may be fragmented by a fragmentation cell. Resulting product ions may then be mass analyzed by a high-resolution mass analyzer, such as a QqTOF, ELIT, orbital ion trap, or TOF-TOF. For samples containing a large number of different ion types to be analyzed it may be difficult to coordinate operation of the tandem mass spectrometer. FIGS. 7A and 7B illustrate embodiments of methods to coordinate or orchestrate operation of the tandem mass spectrometer based on a sentinel ion detected in an MS scan mode, i.e. without fragmentation. In this way, a sentinel ion may be selected having a specific mass in a low noise region (for instance by introducing a mass defect) but that will be detectable in time to switch the tandem mass spectrometer to execute a group of MS/MS scans on the ion beam. In this way the controller is able to trigger the group of MS/MS scans based on detection of the sentinel ion during an MS scan mode. The MS scan mode may be operated without MS/MS operations being executed, or may be operated as part of an MS/MS operation.

Referring to FIG. 7A, in an embodiment a method 700 is provided for tandem mass spectrometry. In step 710 the mass spectrometer monitors an MS scan for a sentinel ion. In step 720 the mass spectrometer detects the sentinel ion. In step 730 the mass spectrometer switches to execute a group of MS/MS scans that are associated with the detected sentinel ion. In step 740 the mass spectrometer executes the group of MS/MS scans by, for each MS/MS scan, fragmenting selected sample ions and mass analyzing the resulting product ions according to that MS/MS scan.

Referring to 7B, in an embodiment a method 705 is provided for tandem mass spectrometry. In step 710 the mass spectrometer monitors an MS scan for a sentinel ion. In step 720 the mass spectrometer detects the sentinel ion. In step 730 the mass spectrometer switches to execute a group of MS/MS scans that are associated with the detected sentinel ion. In step 740 the mass spectrometer executes the group of MS/MS scans by, for each MS/MS scan, fragmenting selected sample ions and mass analyzing the resulting product ions according to that MS/MS scan. In step 750, the mass spectrometer monitors a next MS scan for a next sentinel ion. In step 760, the mass spectrometer detects the next sentinel ion. In step 770, the mass spectrometer switches to execute a next group of MS/MS scans associated with the next sentinel ion.

In some embodiments, the mass spectrometer may monitor for the next sentinel scan will executing the group of MS/MS scans associated with the sentinel ion. In some embodiments, the mass spectrometer may monitor for the next sentinel scan after switching from executing the group of MS/MS scans associated with the sentinel ion to only executing an MS scan for the next sentinel ion.

Figure 8:
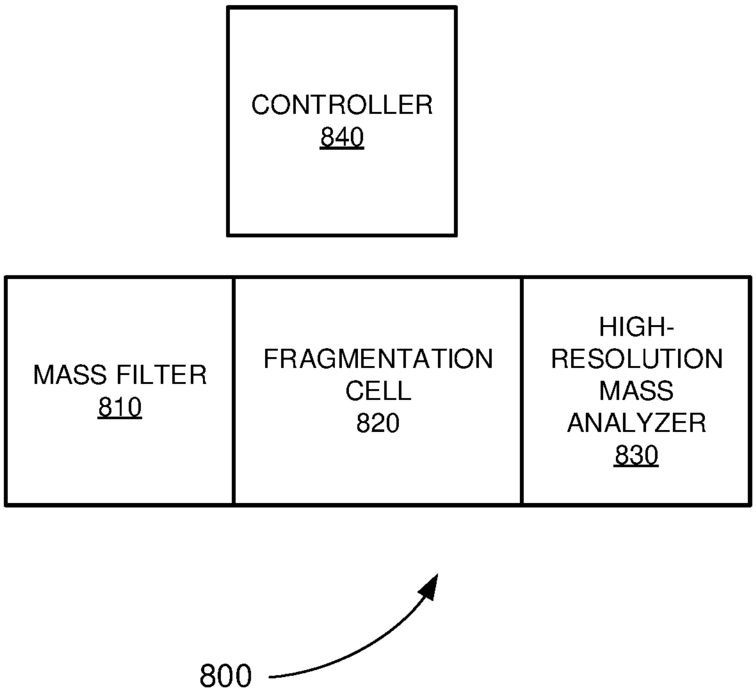
FIG. 8 is a simplified schematic diagram of a tandem mass spectrometer.

FIG. 8 is a simplified schematic diagram of a tandem mass spectrometer 800. The tandem mass spectrometer 800 including at least a mass filter 810, a fragmentation cell 820, and a high-resolution mass analyzer 830. The tandem mass spectrometer 800 further includes a controller 840 operative to direct operation of the mass spectrometer 840. The controller 840 may comprise, for instance, components of the computing system 100 as described above. For instance, the method may be performed by a processor of the controller 840 executing program instructions to direct the mass spectrometer 800 to execute the methods described above.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. Similarly, though the described application used MRM as a detection technique, the described method can be applied to any targeted analysis for MS/MS analysis such as MRM3, single ion monitoring (SIM) or even targeted product ion scan (TOF-MS). In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A high-resolution tandem mass spectrometer comprising:

a mass filter;

a fragmentation cell;

a high-resolution mass analyzer; and, a controller for directing operation of the mass filter, the fragmentation cell, and the high-resolution mass analyzer;

wherein, the controller is operative to direct the mass spectrometer to operate in an MS scan mode to monitor an MS scan without fragmenting incoming sample ions received by the tandem mass spectrometer for a sentinel ion from the incoming sample ions; and, when the mass spectrometer detects the sentinel ion during the MS scan, the controller is operative to direct the mass spectrometer to switch to MS/MS scan mode to monitor at least one MS/MS scan associated with the detected sentinel ion, to fragment, through operation of the fragmentation cell, the incoming sample ions into product ions, and to mass analyze the product ions resulting from fragmentation of the incoming sample ions.

2. The mass spectrometer of claim 1, wherein the controller is further operative during the group of at least one MS/MS scan to monitor a next MS scan for a next sentinel ion; and, when the mass spectrometer detects the next sentinel ion, the controller is operative to direct the mass spectrometer to switch to a next group of at least one MS/MS scans associated with the next sentinel ion.

3. The mass spectrometer of claim 1, wherein the controller is further operative to switch the mass spectrometer to a next MS scan to monitor for a next sentinel ion.

4. The mass spectrometer of claim 1, wherein the MS/MS scan each comprise a separate multiple reaction monitoring (MRM) of the mass spectrometer.

5. The mass spectrometer of claim 1, wherein the controller is further operative to monitor for the sentinel ion by monitoring for at least one isotope of the sentinel ion, and wherein the mass spectrometer detects the sentinel ion by evaluating the mass accuracy of the detected sentinel ion or by evaluating the detected sentinel ion and the at least one isotope to confirm a presence of the sentinel ion.

6. The mass spectrometer of claim 5, wherein the evaluating the detected sentinel ion and the at least one isotope comprises comparing each of the detected sentinel ion and the at least one isotope against an expected intensity threshold.

7. The mass spectrometer of claim 5, wherein the evaluating the detected sentinel ion and the at least one isotope comprises comparing the detected sentinel ion and the at least one isotope are detected in an expected isotopic ratio.

8. The mass spectrometer of claim 1, wherein the sentinel ion is identified by a precursor ion chemical formula stored by the mass spectrometer.

9. The mass spectrometer of claim 8, wherein the controller is further operative to calculate a mass of at least one isotope of the sentinel ion from the precursor ion chemical formula.

10. The mass spectrometer of claim 1, wherein the mass spectrometer further comprises an ion source operative to ionize sample delivered from a separation device.

11. The mass spectrometer of claim 1, wherein the mass spectrometer further comprises a sample introduction device for introducing sample to the mass spectrometer.

12. The mass spectrometer of claim 1, wherein the mass spectrometer is operative to monitor the MS scan of sample ions for a plurality of different sentinel ions, and wherein the controller is operative to direct the mass spectrometer to monitor the MS scan for each sentinel ion based on an expected order of delivery.

13. The mass spectrometer of claim 12, wherein a sample is delivered by elution from a chromatography column, and wherein the controller is operative to order the sentinel ions based on an expected elution order from the chromatography column.

14. The mass spectrometer of claim 13, wherein the expected elution order is provided as a list stored by the mass spectrometer.

15. The mass spectrometer of claim 1, wherein the mass spectrometer is operative to monitor the MS scan ions for a plurality of different sentinel ions and to switch to a corresponding plurality of groups of at least one MS/MS scan each group associated with a corresponding sentinel ion, and wherein the controller is operative to direct the mass spectrometer to overlap MS/MS scans when switching to a next group upon detection of a next sentinel ion in order to ensure correct peak definition.

16. The mass spectrometer of claim 1, wherein the controller is operative to select a stop MS/MS scan for each group, and when a stop MS/MS scan is detected, the controller is operative to direct the mass spectrometer to either switch to a next MS scan to monitor for a next sentinel ion or to switch to a next group of MS/MS scan modes.

17. The mass spectrometer of claim 1, wherein at least one group of MS/MS scan includes an MS scan of a next sentinel ion.

18. The mass spectrometer of claim 1, wherein the mass spectrometer is operative to detect a product ion during each MS/MS scan without using a time window for that MS/MS scan mode.

19. A method for mass spectrometry, comprising a tandem mass spectrometer:

receiving an ion beam of sample ions;

monitoring an MS scan for a sentinel ion, from the sample ions of the ion beam, during operation of the tandem mass spectrometer in MS scan mode without fragmenting the received sample ions of the ion beam;

detecting the sentinel ion during the MS scan;

triggering, upon detection of the sentinel ion during the MS scan, MS/MS scan mode operation of the tandem mass spectrometer, to monitor at least one MS/MS scan associated with the sentinel ion, and, for each of the at least one MS/MS scan:

fragmenting the ion beam of the sample ions into product ions; and mass analyzing the product ions resulting from fragmenting the ion beam of the sample ions during the MS/MS scan mode operation of the tandem mass spectrometer.

20. A system for triggering a group of precursor ion to full product ion spectrum (MS/MS) scans from a series of contiguous groups when an accurate mass of at least one sentinel ion is detected, the system comprising:

a tandem mass spectrometer that receives an ion beam from an ion source and for each cycle of a plurality of cycles executes on the ion beam, during operation of the tandem mass spectrometer in an MS scan mode, an MS scan without fragmenting ions of the ion beam by the tandem mass spectrometer, followed, upon detection of the at least one sentinel ion and switching operation of the tandem mass spectrometer to MS/MS scan mode, by a series of MS/MS scans read from a list, wherein for each MS/MS scan of the series, if an accurate mass of a sentinel precursor ion of the each MS/MS scan is found within a mass threshold from the MS scan, the tandem mass spectrometer selects and fragments the ions of the ion beam, and mass analyzes all product ions resulting from fragmentation of the ions of the ion beam; and a processor in communication with the tandem mass spectrometer that:

receives a plurality of MS/MS scans that each includes a precursor ion accurate mass, divides the plurality of MS/MS scans into two or more contiguous groups so that different groups can be executed separately during the plurality of cycles, selects at least one sentinel MS/MS scan in each preceding group of the two or more contiguous groups that identifies a next group of the two or more contiguous groups that is to be executed, places a first group of the two or more contiguous groups on the list of the tandem mass spectrometer, and when a precursor ion accurate mass of a sentinel MS/MS scan of the first group is detected by the tandem mass spectrometer within the mass threshold during an MS scan performed without fragmenting the ions of the ion beam, places a next group of the two or more contiguous groups identified by the sentinel MS/MS scan on the list.

* * * * *